Oct. 6, 1936. P. EDTBAUER Re. 20,124

COFFEE FILTER

Original Filed April 23, 1932

Inventor:-
PETRONELLA EDTBAUER
E. R. Lundy
Atty:-

Reissued Oct. 6, 1936 Re. 20,124

UNITED STATES PATENT OFFICE 20,124

COFFEE FILTER

Petronella Edtbauer, Berwyn, Ill., assignor to Rose Edtbauer and Julia Edtbauer, both of Chicago, Ill.

Original No. 1,991,198, dated February 12, 1935, Serial No. 607,124, April 23, 1932. Application for reissue February 19, 1936, Serial No. 64,707

13 Claims. (Cl. 53—3)

My present invention relates to an apparatus for making coffee and is designed to carry out the principle of depositing ground coffee in a container that is mounted upon the top of a coffee-pot or the like and then pouring into the container boiling water which is permitted to filter through the ground coffee into the coffee-pot. A structure of this character avoids the use of a fabric bag, or the cloth or paper filter, and also successfully prevents the boiling of the finished coffee which usually has a tendency to spoil the aroma and taste of the fluid coffee.

In carrying out my invention I employ a movable sieve or filter that is capable of being accurately and positively adjusted to take care of the required or desired number of cups of coffee that are to be made, and this adjustable sieve or filter also permits the adaptation of the filtration for different types of ground or pulverized coffee, as well as provides for accurately timing the period of filtration. The structure is adapted for use with finely ground coffee, with the result that, by timing the period of filtration the water passing through the ground coffee does not take up or assimilate any of the objectionable or deleterious ingredients of the coffee bean.

Among the objects of my invention are the provision of an apparatus for preparing coffee which is simple in construction and easy to manipulate; is made of a few dependable parts that will not readily get out of order; will provide means whereby adjustment of the sieve or filter element may be accurately made by persons unskilled in the art of coffee making; and the structure is made up of a minimum of novel parts that may be economically manufactured and sold at a reasonable retail price.

In addition to the foregoing, my apparatus successfully overcomes certain of the defects, objections, and disadvantages that are found to be inherent in coffee-making devices heretofore produced. Other objects and advantages of my improvements will be apparent to others skilled in the art after my invention is understood from the following description.

I prefer to carry out my invention and to accomplish the numerous objects thereof in substantially the manner hereinafter fully described and as more particularly pointed out in the claims. Reference is now made to the accompanying drawing that forms a part of this specification.

In the drawing.

The drawing, it will be understood, is more or less schematic for the purpose of disclosing a typical or preferred form in which my invention may be made, and in said drawing like reference characters are employed to designate like parts wherever they appear in the different views.

Figure 1:
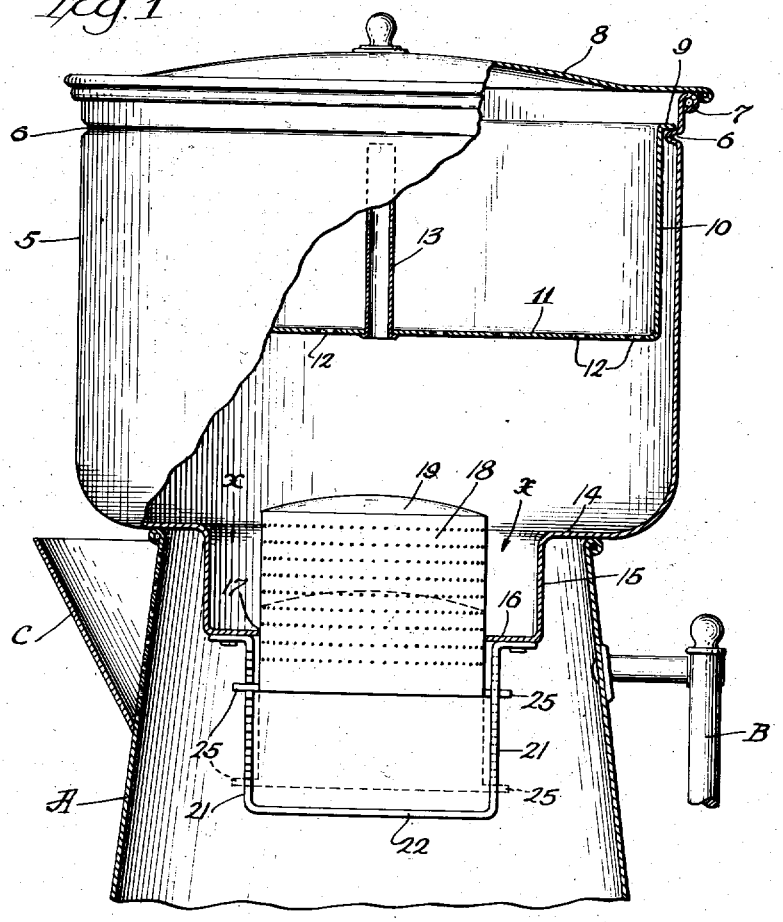
Figure 1 is a view, partly in broken away section, showing my invention applied to an ordinary coffee-pot, the latter being only partially shown.
Figure 2:
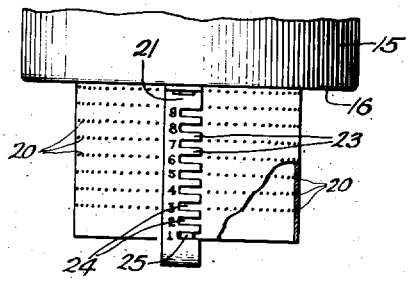
Figure 2 is a view of the sieve or filter element and the lower portion of the nozzle or funnel viewed at a right-angle to the structure shown in Figure 1.

In Figure 1, the well-known type of coffee-pot, designated at A has a suitable handle B and a pouring spout C, all of which are of usual construction. The hinged top, so far as this disclosure is concerned, has been omitted, but in actual practice the top or lid may be turned back upon its hinge for conveniently using my appliance.

The structure which I have devised consists of a hollow receptacle 5 that is cylindrical in shape and, adjacent its upper edge or rim, is provided with an inwardly extending bead 6, while its top edge is turned-back or rolled as at 7 and it is closed by a suitable cover or lid 8 that rests upon the rolled-back portion 7.

The bead 6 provides a stop or shoulder upon which the outwardly extending annular flange 9 of a water-spreader rests and is supported within the receptacle 5. The water-spreader has a cylinder body 10 that is preferably imperforate while its bottom 11 is provided with a plurality of apertures 12 through which the water deposited in the spreader will be distributed into the portion of the receptacle 5 below the spreader. An air-vent, in the form of a short tube 13, extends upwardly from the central portion of the bottom 11 in the manner shown, and the depth of this spreader is such that its bottom will be spaced from the particles of ground coffee that are deposited in the receptacle.

The lower portion of the container 5 has its annular wall turned inwardly to provide a wide shoulder 14, which, when the appliance is in use, will rest upon and be supported by the upper rim of the coffee-pot A. This inturned portion or shoulder 14 also assists in providing a restricted nozzle or funnel at the lower end of the receptacle 5. The nozzle or funnel just referred to consists of a downwardly extending wall 15 that is cylindrical in shape and preferably concentric with the main wall of the receptacle 5 and, at its lower portion, it has an inturned flange 16, thus providing a restricted opening 17 in the lower end of the nozzle or funnel.

The filter is an inverted cup-shaped element consisting of a cylindrical wall 18 that has a dome-shaped top closure 19 which is imperforate. The cylindrical side wall of this element is provided with a plurality of small perforations 20 that are preferably arranged in parallel rows extending transversely around the cylinder 18 and spaced apart vertically, the upper row of perforations being slightly below the edge of the dome 19 and the bottom row of perforations being slightly above the lower edge of the cylinder 18. The outside diameter of this element, (that is the exterior surface of the wall of the cylinder 18), is such that a frictional sliding fit is had between said element and the edge of opening 17 at the bottom of the nozzle or funnel of the receptacle. This permits the filter element to be moved up or down so that it may be positioned at any location desired and thus expose or open any number of perforations 20 above the flange 16 of the nozzle or funnel, to carry out the filtration of the water through the ground coffee and into the coffee-pot A.

Ordinarily the structure above described could be manipulated in a dependable manner by a person who would use skill and care in making the adjustment, but in order to provide accurate and positive means for determining the proper amount of adjustment relative to the number of cups of coffee to be made I have provided a definite gauge so that unskilled persons will not incorrectly manipulate the filter element. To this end I have provided a pair of arms 21 each of which is secured or anchored at one end to the flange 16, and at their other ends the arms connected to a cross-piece 22 so that a substantially U-shaped yoke is provided. The space between the arms is greater than the outside diameter of the filter elements, or the diameter of the opening 17 in which the filter element is adjustably mounted. In Figure 1 of the drawing I have shown the arms 21 depending from the flange but it is obvious they may extend upwardly into the receptacle, or arranged in any other suitable manner.

The arms are provided with serrations 23 that are properly spaced apart to designate the various points of adjustment to which the filter element may be set in order to accurately time the filtration in direct relation to the number of cups of coffee to be made or to the grind of the coffee being used. As will be seen in the drawing, these serrations are made upon opposite edges of the arms 21, the purpose of which will be hereinafter explained. Cooperating with the slots 24 that are between the serrations 23 are lateral lugs or ears 25 that project radially from the lower edge of the cylindrical wall 18 of the filter element, so that, by a slight rotative movement of the filter element, the lugs or ears 25 may be selectively engaged with the different slots 24 in the arms and the filter element maintained against accidental up or down movement.

In any of its adjusted positions in the opening 17 the filter element will be projected above the lower lateral flange 16 and will be separated from the nozzle wall 15 to provide an annular groove or trough $x$ between said parts. The ground coffee, when a small quantity is used is deposited in this trough as it will gravitate off the dome-shaped top of the filter element, and when larger quantities of ground coffee is used a portion of the latter will lie upon the shoulder or flange 14 of the receptacle.

When using the appliance to prepare, for example, four cups of coffee, the lugs or ears 25 of the filter element are inserted in the fourth slot 24 up from the bottom of the arms, and the proper amount of the ground coffee is placed in the receptacle so that the ground coffee will be deposited in the annular trough $x$. When the lugs or ears 25 are in their proper slots 24 the desired number of rows of perforations 20 will be exposed and above the horizontal plane of the unturned lower flange 16 of the nozzle. The spreader is then placed in the receptacle and four cups of boiling water are poured into the top of the receptacle, immediately after which the cover 8 is placed on the receptacle.

The spreader distributes the boiling water over the ground coffee and the water seeps or filters through the latter and through the perforations 20 to the interior of the filter element from which it falls into the coffee-pot or other receptacle upon which the appliance is mounted. This operation permits the water to take out or extract the taste and flavor of the ground coffee and after all of the water has filtered through into the pot A or other receptacle the product is ready for consumption.

The same method is employed for making any number of cups of coffee, simply by inserting the lugs or ears 25 into the slots designating the required number of cups of coffee to be made. On account of the perforations in the filter element being in the vertical wall of the filter the weight of the water pressing downwardly upon the ground coffee does not interfere materially with the filtration operation and the seepage of the water is continuous and with a steady flow resulting in a clear fluid without sediment.

It will be understood that modifications or refinements of the exact structure herein disclosed may be made without materially departing from the principles of my invention. Hence, the accompanying drawing and the within description are given for the purpose of clearness of understanding only and no unnecessary limitations are to be understood therefrom, but the claims are to be construed as broadly as permissible in view of the prior art.

What I claim is:—

1. A coffee making device comprising a coffee ground receptacle, a restricted throat extending down from said receptacle, an inwardly projecting annular flange in said throat that provides an opening of less diameter than the throat, a cylindrical inverted cup-shaped filter element adjustably mounted in said opening, arms projecting from said throat alongside said filter element, and cooperating means on said filter element and said arms for predetermining and releasably maintaining said filter element in divers adjusted positions.

2. A coffee making device comprising a coffee ground receptacle, a restricted throat depending therefrom and having an opening in its lower end, transversely slotted arms pendent from said throat, an inverted cup-shaped filter element adjustable in said opening, the side wall of said element being perforated, and lateral members on said element cooperable with the slots in the arms for maintaining the element at divers heights within the throat and uncover a predetermined number of perforations within the throat.

3. A coffee making device comprising a coffee ground receptacle having an opening in its bottom, an inverted cup-shaped filter element having a perforated cylindrical wall disposed in said opening and extended into said receptacle to provide an annular trough around said filter element, vertical arms projecting from said receptacle alongside said filter element, and cooperating means on said arms and said element for maintaining the latter at divers heights within said receptacle.

4. A coffee making device comprising a coffee ground receptacle having an opening in its bottom, an inverted cup-shaped filter element having a perforated cylindrical wall disposed in said opening and extended into said receptacle to provide an annular trough around said filter element, transversely recessed arms projecting from said receptacle alongside said filter element, and lateral members on said filter element that are cooperable with said recesses for adjustably positioning said filter element with respect to said receptacle.

5. The combination with a suitable container, of a coffee making device comprising a coffee ground receptacle having a shouldered lower portion resting upon the rim of said container to support the receptacle, a cylindrical wall extending down from said shoulder into said container, an inwardly extending flange on said cylindrical wall providing an opening of less diameter than said wall, a filter having a cylindrical perforated wall positioned in said opening whereby an annular trough is provided around said filter, stationary parallel arms alongside said filter, and means cooperating with said arms and filter for maintaining the latter in divers adjusted positions.

6. The combination with a suitable container, of a coffee making device comprising a coffee ground receptacle having a shouldered lower portion resting upon the rim of said container to support the receptacle, a cylindrical wall extending down from said shoulder into said container, an inwardly extending flange on said cylindrical wall providing an opening of less diameter than said wall, a filter having a cylindrical perforated wall positioned in said opening whereby an annular trough is provided around said filter, transversely slotted stationary arms alongside said filter, and lateral lugs on said filter that enter opposite slots in said arms for maintaining the filter in adjusted positions determined by the respective slots.

7. An appliance for making coffee comprising a coffee ground receptacle having an opening in its bottom, a filter element adjustably mounted in said opening, arms projecting from said receptacle alongside said filter element, and means on the filter element coacting with said arms to provide predetermined adjustment of said element.

8. An appliance for making coffee comprising a coffee ground receptacle having an opening in its bottom, a filter element adjustably mounted in said opening, transversely slotted arms projecting from said receptacle alongside said filter element, and lateral lugs on said filter element coacting with the slots in said arms to position the filter element at different heights within the receptacle.

9. In a coffee making device of the class described, the combination of a receptacle having an upper portion of enlarged diameter for receiving and distributing the coffee over a relatively large area, an annular flange disposed radially at the bottom of said upper portion of enlarged diameter, a cylindrical wall of reduced diameter extending downwardly from said annular flange, a planar annular flange extending radially inwardly from the lower end of said wall of reduced diameter and defining an opening, and a filter element adjustably mounted in said opening, said filter element being closed at the top and having a wall parallel with the reduced diameter wall of the receptacle and in relatively close proximity thereto whereby the ratio of the effective area of said filter element to the amount of ground coffee exposed thereto remains substantially constant for different amounts of ground coffee by adjustment thereof.

10. A coffee making device comprising a coffee ground receptacle, a restricted throat extending downwardly from said receptacle, an inwardly projecting planar annular flange in said throat providing an opening of less diameter than the throat, a cylindrical inverted cup-shaped filter element in said opening, said filter element being adjustably mounted to provide a substantially constant ratio between the effective area thereof and the amount of ground coffee exposed thereto for different amounts of coffee, and latching means for securing said filter element in different adjusted positions.

11. A coffee making device comprising a receptacle having an opening in its bottom and having a radially spaced annular cylindrical wall extending upwardly from said opening, an inverted cup-shaped filter element having a perforated cylindrical wall disposed in said opening and extended into said receptacle to define with said wall an annular trough about said element for receiving ground coffee, said filter element being adjustably mounted to provide a substantially constant ratio between the effective area thereof and the amount of ground coffee exposed thereto for different amounts of coffee, and latching means disposed below said trough for supporting said filter element in different adjusted positions.

12. The combination with a suitable container, of a coffee making device comprising a receptacle having a shouldered lower portion resting upon the rim of said container to support the receptacle, a cylindrical wall extending down from said shoulder into said container, an inwardly extending planar flange on said cylindrical wall providing an opening of less diameter than said wall, a filter having a cylindrical perforated wall positioned in said opening whereby an annular coffee ground receiving trough is provided around said filter, said filter element being adjustably mounted to provide a substantially constant ratio between the effective area thereof and the amount of ground coffee exposed thereto for different amounts of coffee, and latching means for securing said filter element in different adjusted positions.

13. In a coffee making device comprising a coffee ground receptacle, a filter element comprising a perforated inverted cup shaped member, said receptacle having means defining an annular axially extending trough of uniform width extending about the lateral surface of said element and closed at its lower end about said element, and means supported by said receptacle below the lower end of said trough and having interlocking engagement with the adjacent portion of said element for adjustably supporting said element at different heights axially of said trough.

PETRONELLA EDTBAUER.